(12) United States Patent
Young et al.

(10) Patent No.: US 11,702,111 B2
(45) Date of Patent: Jul. 18, 2023

(54) METHOD AND APPARATUS FOR ESTIMATING OBJECT RELIABILITY

(71) Applicant: HERE Global B.V., Eindhoven (NL)

(72) Inventors: Jeremy Michael Young, Chicago, IL (US); Leon Stenneth, Chicago, IL (US); Jerome Beaurepaire, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 239 days.

(21) Appl. No.: 17/118,376

(22) Filed: Dec. 10, 2020

(65) Prior Publication Data
US 2022/0055643 A1 Feb. 24, 2022

Related U.S. Application Data

(60) Provisional application No. 63/067,558, filed on Aug. 19, 2020.

(51) Int. Cl.
*B60W 60/00* (2020.01)
*B60W 50/14* (2020.01)
(Continued)

(52) U.S. Cl.
CPC ........ *B60W 60/0059* (2020.02); *B60W 50/14* (2013.01); *B60W 60/0015* (2020.02);
(Continued)

(58) Field of Classification Search
None
See application file for complete search history.

(56) References Cited

U.S. PATENT DOCUMENTS

| 10,324,463 | B1 * | 6/2019 | Konrardy | G05D 1/0278 |
| 11,112,794 | B2 * | 9/2021 | Chi-Johnston | G01C 21/3461 |

(Continued)

FOREIGN PATENT DOCUMENTS

| CN | 109641589 A  * | 4/2019 | ........... B60W 30/09 |
| DE | 102021203056 A1 * | 9/2022 | |

(Continued)

OTHER PUBLICATIONS

Merzic et al., *Map Quality Evaluation for Visual Localization*, ETH Zurich, ResearchGate, https://www.researchgate.net/publication/317672134, May 2017 (8 pages).

*Primary Examiner* — Kevin R Steckbauer
(74) *Attorney, Agent, or Firm* — Alston & Bird LLP

(57) ABSTRACT

A method, apparatus, and computer program product are provided for identifying the reliability of objects within a mapped region for localization and facilitating autonomous control of a vehicle. Methods may include: receiving an indication of an event having event data; assigning at least one object at a location of the event an impact score based on an estimated impact of the event; and providing an indication of a reduction in autonomous vehicle capability in response to the impact score failing to satisfy a predetermined value. The impact score may include a probability that the corresponding object is reliable for localization or autonomous vehicle control. Methods may include providing the indication of a reduction in autonomous vehicle capability to at least one device associated with a vehicle in response to the at least one device associated with the vehicle having a travel path including the at least one road link.

20 Claims, 9 Drawing Sheets

(51) Int. Cl.
  *G05D 1/00* (2006.01)
  *G01C 21/00* (2006.01)
(52) U.S. Cl.
  CPC .... *B60W 60/0053* (2020.02); *B60W 60/0054* (2020.02); *G01C 21/3804* (2020.08); *G05D 1/0088* (2013.01); *B60W 2050/146* (2013.01); *B60W 2554/20* (2020.02); *B60W 2555/20* (2020.02); *B60W 2556/20* (2020.02); *B60W 2556/40* (2020.02); *B60W 2756/10* (2020.02); *G05D 2201/0213* (2013.01)

(56) References Cited

U.S. PATENT DOCUMENTS

| | | | | |
|---|---|---|---|---|
| 11,288,612 | B2* | 3/2022 | Kislovskiy | G08G 1/202 |
| 11,422,000 | B2* | 8/2022 | Pedersen | G01C 21/3476 |
| 11,561,547 | B2* | 1/2023 | Joseph | G08G 1/096838 |
| 2015/0233720 | A1* | 8/2015 | Harada | G06V 20/56 |
| | | | | 701/409 |
| 2017/0241791 | A1* | 8/2017 | Madigan | G06Q 40/08 |
| 2019/0204092 | A1* | 7/2019 | Wheeler | G05D 1/0246 |
| 2019/0383624 | A1* | 12/2019 | Magzimof | H04W 8/08 |
| 2020/0264605 | A1* | 8/2020 | Chi-Johnston | G01C 21/3461 |
| 2020/0264619 | A1* | 8/2020 | Joseph | G08G 1/096816 |
| 2021/0191394 | A1* | 6/2021 | Dudley | G05D 1/0061 |
| 2022/0055643 | A1* | 2/2022 | Young | G05D 1/0088 |
| 2022/0089192 | A1* | 3/2022 | Gyllenhammar | |
| | | | | B60W 30/0956 |
| 2022/0121210 | A1* | 4/2022 | Herman | G05D 1/0214 |
| 2022/0155075 | A1* | 5/2022 | Jeon | B60W 30/18145 |
| 2022/0204016 | A1* | 6/2022 | Lerner | B60W 60/0059 |
| 2022/0281456 | A1* | 9/2022 | Giovanardi | B60W 30/16 |
| 2022/0350336 | A1* | 11/2022 | Gyllenhammar | G05D 1/0221 |
| 2022/0357171 | A1* | 11/2022 | Pedersen | G01C 21/343 |
| 2022/0363266 | A1* | 11/2022 | Yasuda | B60W 50/14 |
| 2022/0371622 | A1* | 11/2022 | Malla | B60W 60/0015 |
| 2023/0020040 | A1* | 1/2023 | Tam | G08G 1/0141 |

FOREIGN PATENT DOCUMENTS

| | | | | |
|---|---|---|---|---|
| EP | 3795441 | A1 * | 3/2021 | ......... B60W 30/182 |
| EP | 3915851 | A1 * | 12/2021 | ............ B60W 50/06 |
| EP | 4001844 | A1 * | 5/2022 | ...... B60W 30/18145 |
| EP | 4064238 | A1 * | 9/2022 | |
| JP | 2022179383 | A * | 12/2022 | ............ B60W 10/30 |
| WO | WO-2017218563 | A1 * | 12/2017 | ............ B60W 30/09 |
| WO | WO-2021127468 | A1 * | 6/2021 | ............ B60W 40/02 |
| WO | WO-2022140657 | A1 * | 6/2022 | ...... B60W 30/18163 |

* cited by examiner

| Event | Condition | Object Type | Impact Score |
|---|---|---|---|
| Strong Winds | Winds 50-65mph | Signs | .85 |
| Tornado Class EF0 | Winds 65-85mph | Signs | .4 |
| Tornado Class EF1 | Winds 86-110 mph | Signs | .25 |
| Tornado Class EF2 | Winds 111-135 mph | Signs | .2 |
| Tornado Class EF3 | Winds 136-165 mph | Signs | .1 |
| Tornado Class EF4 | Winds 166-200 mph | Signs | .05 |
| Tornado Class EF5 | Winds > 201 mph | Signs | .01 |
| Strong Winds | Winds 50-65mph | Poles | .95 |
| Tornado Class EF0 | Winds 65-85mph | Poles | .85 |
| Tornado Class EF1 | Winds 86-110 mph | Poles | .7 |
| Tornado Class EF2 | Winds 111-135 mph | Poles | .5 |
| Tornado Class EF3 | Winds 136-165 mph | Poles | .3 |
| Tornado Class EF4 | Winds 166-200 mph | Poles | .25 |
| Tornado Class EF5 | Winds > 201 mph | Poles | .2 |
| Strong Winds | Winds 50-65mph | Jersey Barriers | 1 |
| Tornado Class EF0 | Winds 65-85mph | Jersey Barriers | .95 |
| Tornado Class EF1 | Winds 86-110 mph | Jersey Barriers | .9 |
| Tornado Class EF2 | Winds 111-135 mph | Jersey Barriers | .85 |
| Tornado Class EF3 | Winds 136-165 mph | Jersey Barriers | .8 |
| Tornado Class EF4 | Winds 166-200 mph | Jersey Barriers | .6 |
| Tornado Class EF5 | Winds > 201 mph | Jersey Barriers | .4 |

FIG. 7

| Lat/Long | Road Link ID | Operational Score | Observed Score |
|---|---|---|---|
| 36.152827, -86.754821 | 1234567 | .6 | .75 |
| 34.453577, -89.762341 | 7654321 | .9 | .95 |

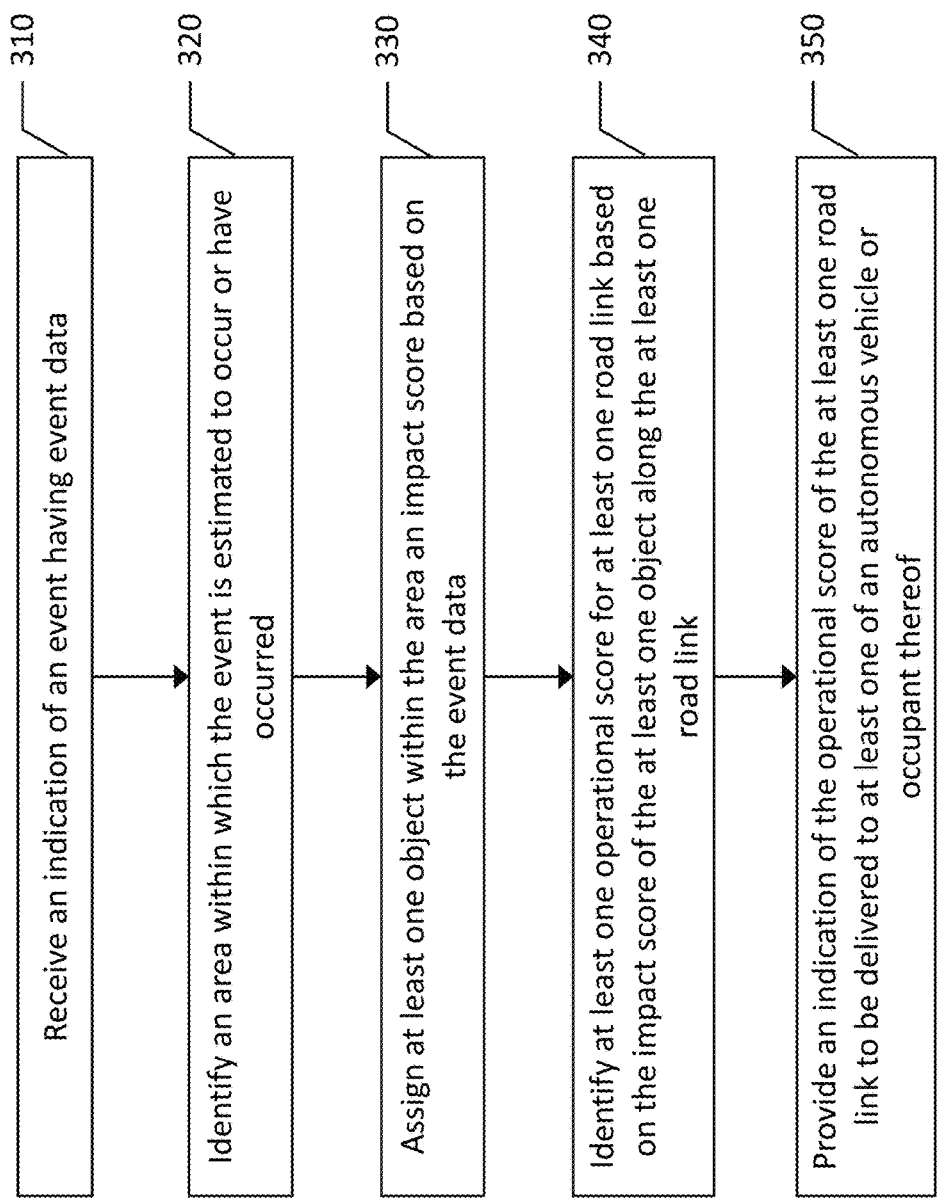

METHOD AND APPARATUS FOR ESTIMATING OBJECT RELIABILITY

CROSS-REFERENCE TO RELATED APPLICATIONS

This application claims priority to U.S. Provisional Patent Application Ser. No. 63/067,558, filed on Aug. 19, 2020, the contents of which are hereby incorporated by reference in their entirety.

TECHNOLOGICAL FIELD

Example embodiments of the present disclosure relate generally to identifying the reliability of objects within a mapped region, and more particularly, to establishing an operational score reflecting the reliability of objects for facilitating localization and autonomous vehicle control based on events that may adversely affect objects through changing of the appearance or position of objects.

BACKGROUND

Location identification of a user or apparatus within an environment is important for a variety of purposes. Location-based services require an understanding of a location of a user or apparatus associated with the user in order to provide useful service, such as navigation. While global navigation satellite systems (GNSS) can determine a location of a device within a margin of error, that margin of error may be too great for certain location based services and may be too great to facilitate functionality such as autonomous vehicle control.

Road geometry modelling and object modelling is useful for map creation and identification of objects of interest in environments, such as road signs, poles, or lane lines along a road segment. Such object identification may facilitate autonomous vehicle navigation along a prescribed path and/or visual self-localization of a vehicle traveling along a road segment based on scene or environment identification. Traditional methods for modelling of road geometry and environment or feature detection are resource intensive, often requiring significant amounts of human measurement and calculation. Further, localization relying on road geometry modelling relies upon consistency of an environment.

BRIEF SUMMARY

Accordingly, a method, apparatus, and computer program product are provided for identifying the reliability of objects within a mapped region, and more particularly, to establishing an operational score reflecting the reliability of objects for facilitating localization and autonomous vehicle control based on events that may adversely affect objects through changing of the appearance of objects. Embodiments described herein may provide an apparatus including at least one processor and at least one non-transitory memory including computer program code instructions with the computer program code instructions configured to, when executed, cause the apparatus to at least: receive an indication of an event having event data; identify an area within which the event is estimated to occur or to have occurred; assign at least one object within the area an impact score based on the event data; identify at least one operational score for at least one road link based on the impact score of the at least one object along the at least one road link; and provide an indication of the operational score of the at least one road link to be delivered to at least one of an autonomous vehicle or an occupant thereof.

According to some embodiments, causing the apparatus to provide an indication of the operational score of the at least one road link to at least one of an autonomous vehicle or an occupant thereof includes causing the apparatus to provide an indication of the operational score of the at least one road link to at least one of an autonomous vehicle or occupant thereof in response to a route of the autonomous vehicle traversing the at least one road link. Causing the apparatus to provide an indication of the operational score of the at least one road link to at least one of an autonomous vehicle or occupant thereof further comprises causing the apparatus to provide an indication of autonomous vehicle control being reduced in response to an operational score below a predefined threshold.

Causing the apparatus to provide an indication of the operational score of the at least one road link to at least one of an autonomous vehicle or occupant thereof may, according to some embodiments, cause the apparatus to provide an indication of autonomous vehicle control ceasing before traversing the at least one road link. Causing the apparatus to assign at least one object within the boundary an impact score based on the event data may include causing the apparatus to: identify a plurality of object types; and assign the plurality of object types an impact score based on the object type and the event data, where the event data includes event type and event severity.

According to some embodiments, causing the apparatus to assign the plurality of object types an impact score based on the localization object type and the event data may include causing the apparatus to: assign the plurality of object types an impact score based on the object type and the event data from a relational database relating object type resiliency to event types and event severities. The apparatus may optionally be caused to receive, from sensor data collected along the at least one road link, an observed impact score; and update an operational score for the at least one road link based on the observed impact score. The indication of the event may be received from a weather information source, where the area within which the event is estimated to have occurred is received from the weather information source based on gathered weather data.

Embodiments provided herein include a computer program product having at least one non-transitory computer-readable storage medium having computer-executable program code instructions stored therein, the computer-executable program code instructions including program code instructions to: receive an indication of an event having event data; determine at least one operational score for at least one road link based on the estimated impact of the event on one or more objects associated with the at least one road link; and provide an indication of the operational score of the at least one road link to at least one of a map services provider, an autonomous vehicle, or an occupant thereof. The program code instructions to provide an indication of the operational score of the at least one road link to at least one of a map services provider, an autonomous vehicle, or an occupant thereof may include program code instructions to provide an indication of the operational score of the at least one road link to at least one of an autonomous vehicle or an occupant thereof in response to a route of the autonomous vehicle traversing the at least one road link.

According to some embodiments, the program code instructions to provide an indication of the operational score of the at least one road link to at least one of a map services provider, an autonomous vehicle, or an occupant thereof may include program code instructions to provide an indication to at least one of an autonomous vehicle or an occupant thereof of autonomous vehicle control being reduced in response to an operational score below a predefined threshold. The program code instructions to provide an indication of the operational score of the at least one road link to at least one of a map services provider, an autonomous vehicle, or an occupant thereof may include program code instructions to provide an indication to at least one of an autonomous vehicle or occupant thereof of autonomous vehicle control ceasing before traversing the at least one road link.

The program code instructions to determine at least one operational score for at least one road link based on estimated impact of the event on one or more objects may include program code instructions to: identify a plurality of object types associated with the at least one road link; and assign the plurality of object types an impact score based on the object type and the event data, where the event data includes event type and event severity. Embodiments may include program code instructions to: receive, from sensor data collected along the at least one road link, an observed impact score for the one or more objects; and update an operational score for the at least one road link based on the observed impact score. The indication of the event may be received from a weather information source, where the at least one road link is within an area within which the event is estimated to have occurred, where the area is received from the weather information source based on gathered weather data. The impact score may include a probability that the corresponding object is reliable for information autonomous vehicle control.

Embodiments provided herein may include a method including: receiving an indication of an event having event data; assigning at least one object at a location of the event an impact score based on an estimated impact of the event; and providing an indication of a reduction in autonomous vehicle capability in response to the impact score failing to satisfy a predetermined value. The impact score may include a probability that the corresponding object is reliable for localization or autonomous vehicle control. Providing an indication of a reduction in autonomous vehicle capability in response to the impact score of at least one object failing to satisfy a predetermined value may include providing a temporary indication of a reduction in autonomous vehicle capability associated with at least one road link associated with the at least one object in response to the impact score for the at least one object failing to satisfy the predetermined value. Methods may include providing the indication of a reduction in autonomous vehicle capability associated with the at least one road link to at least one device associated with a vehicle in response to the at least one device associated with the vehicle having a travel path including the at least one road link.

Embodiments provided herein may include an apparatus including: means for receiving an indication of an event having event data; means for assigning at least one object at a location of the event an impact score based on an estimated impact of the event; and means for providing an indication of a reduction in autonomous vehicle capability in response to the impact score failing to satisfy a predetermined value. The impact score may include a probability that the corresponding object is reliable for localization or autonomous vehicle control. The means for providing an indication of a reduction in autonomous vehicle capability in response to the impact score of at least one object failing to satisfy a predetermined value may include means for providing a temporary indication of a reduction in autonomous vehicle capability associated with at least one road link associated with the at least one object in response to the impact score for the at least one object failing to satisfy the predetermined value. An example apparatus may include means for providing the indication of a reduction in autonomous vehicle capability associated with the at least one road link to at least one device associated with a vehicle in response to the at least one device associated with the vehicle having a travel path including the at least one road link.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
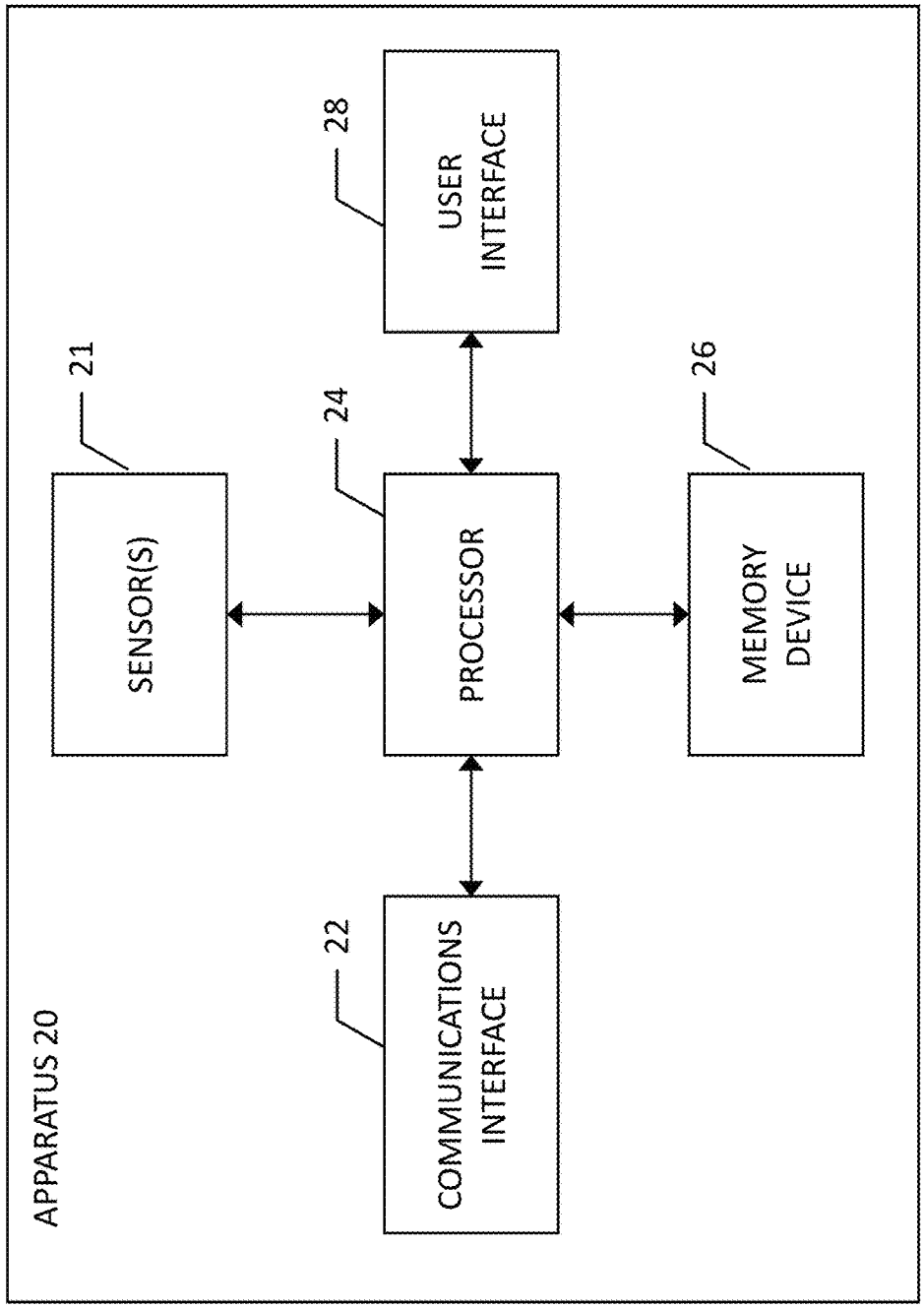
Figure 2:
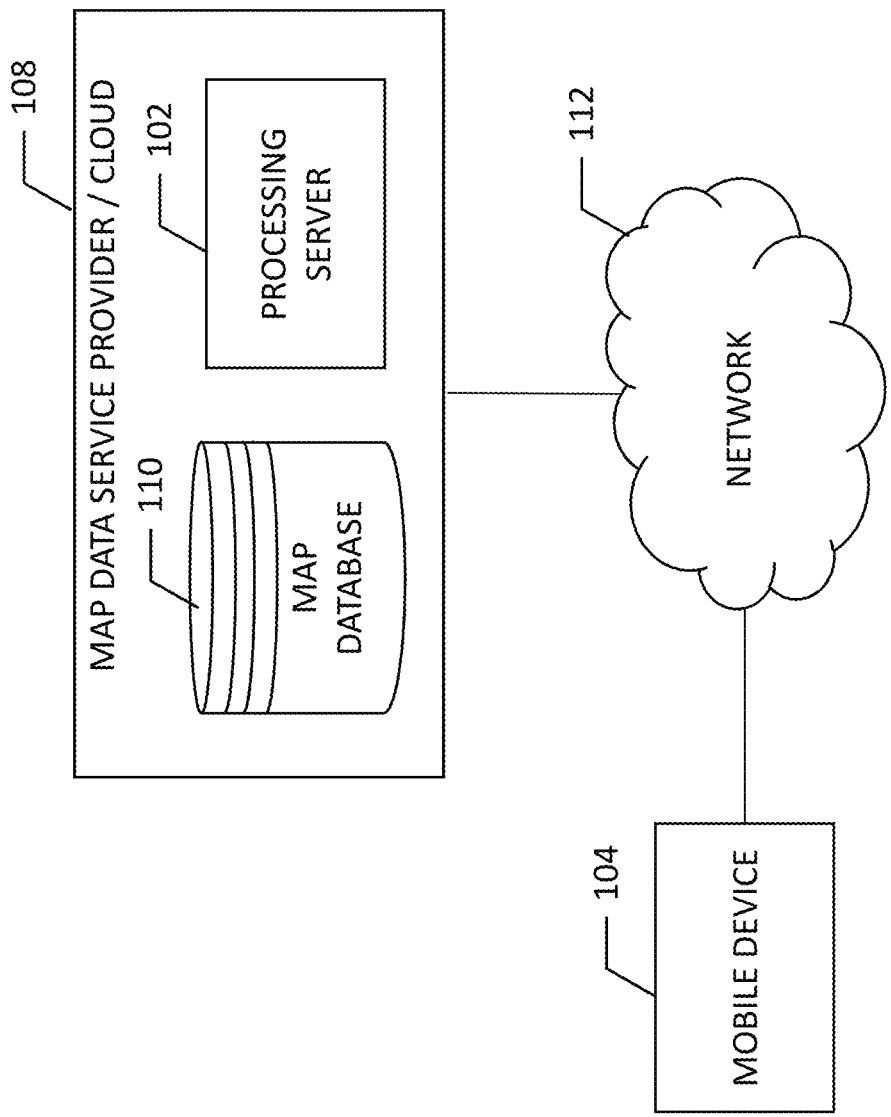
Figure 3:
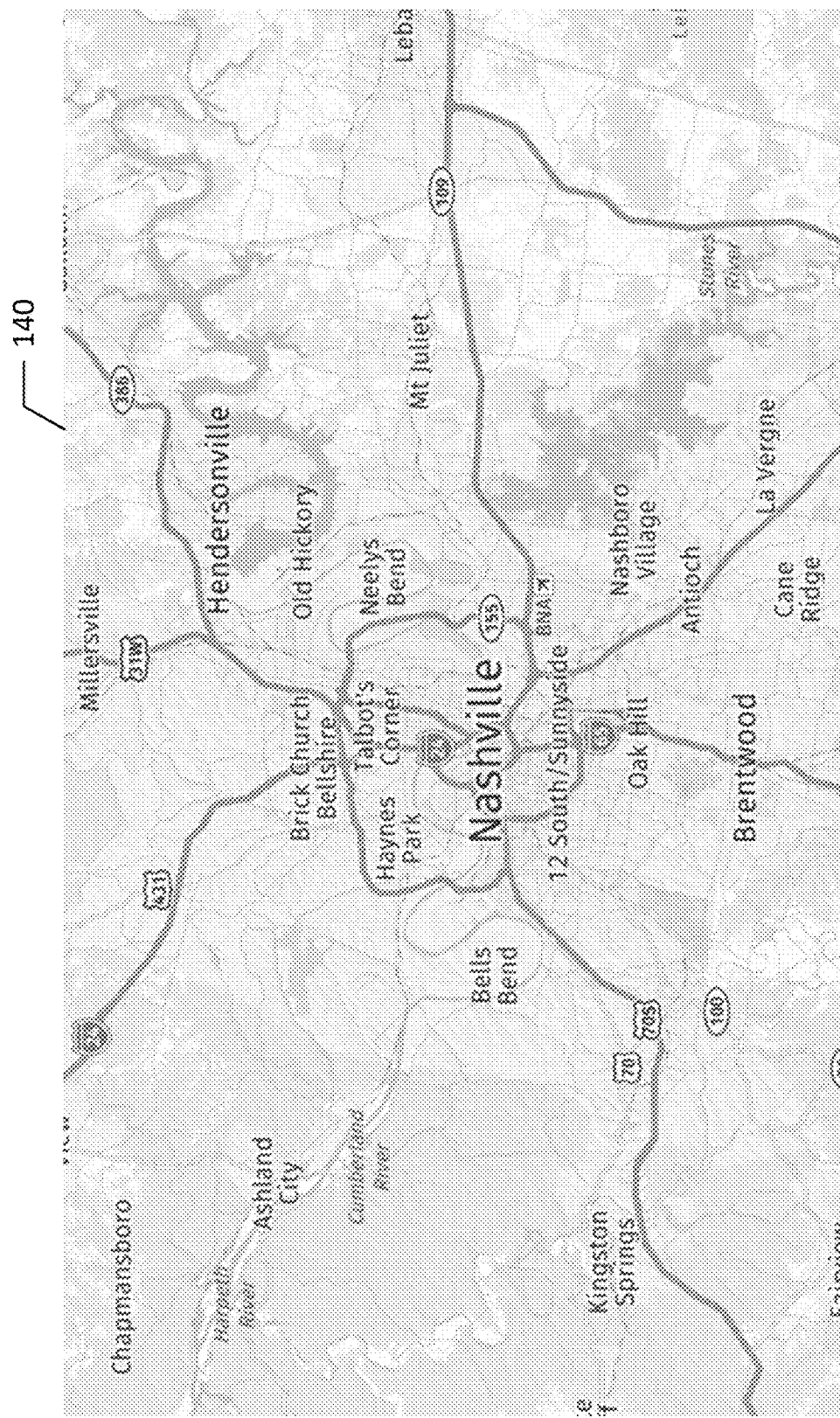
Figure 4:
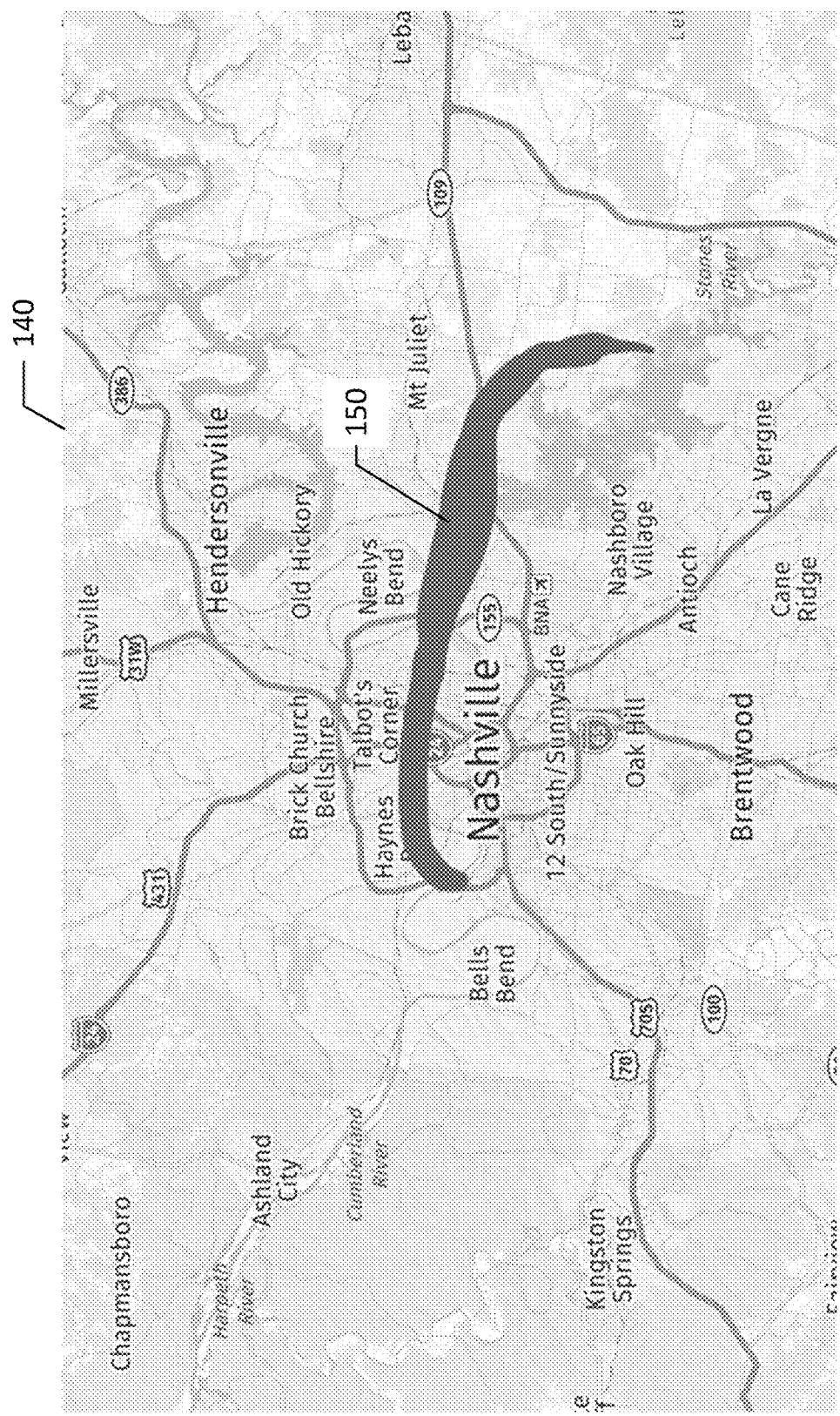
Figure 5:
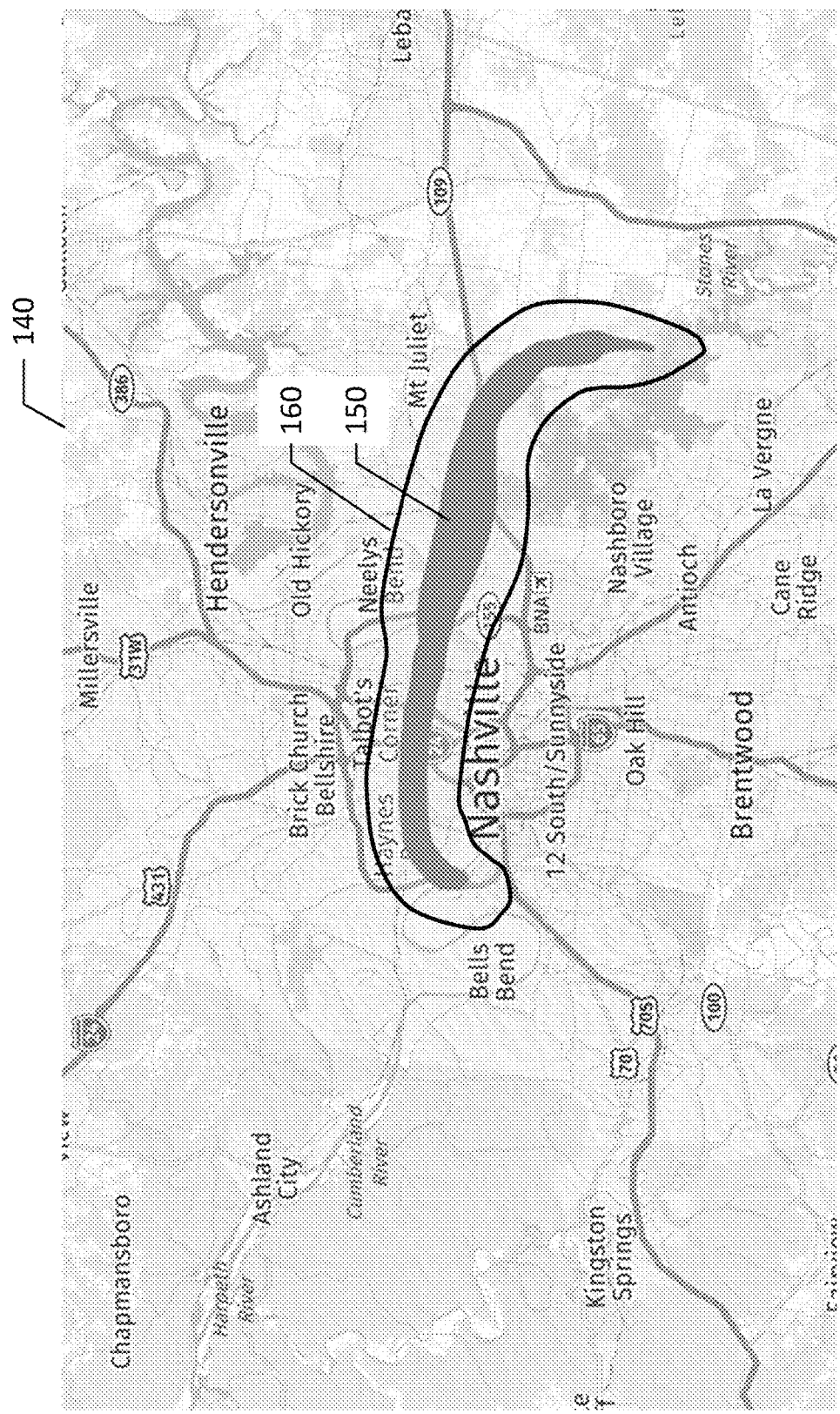
Figure 6:
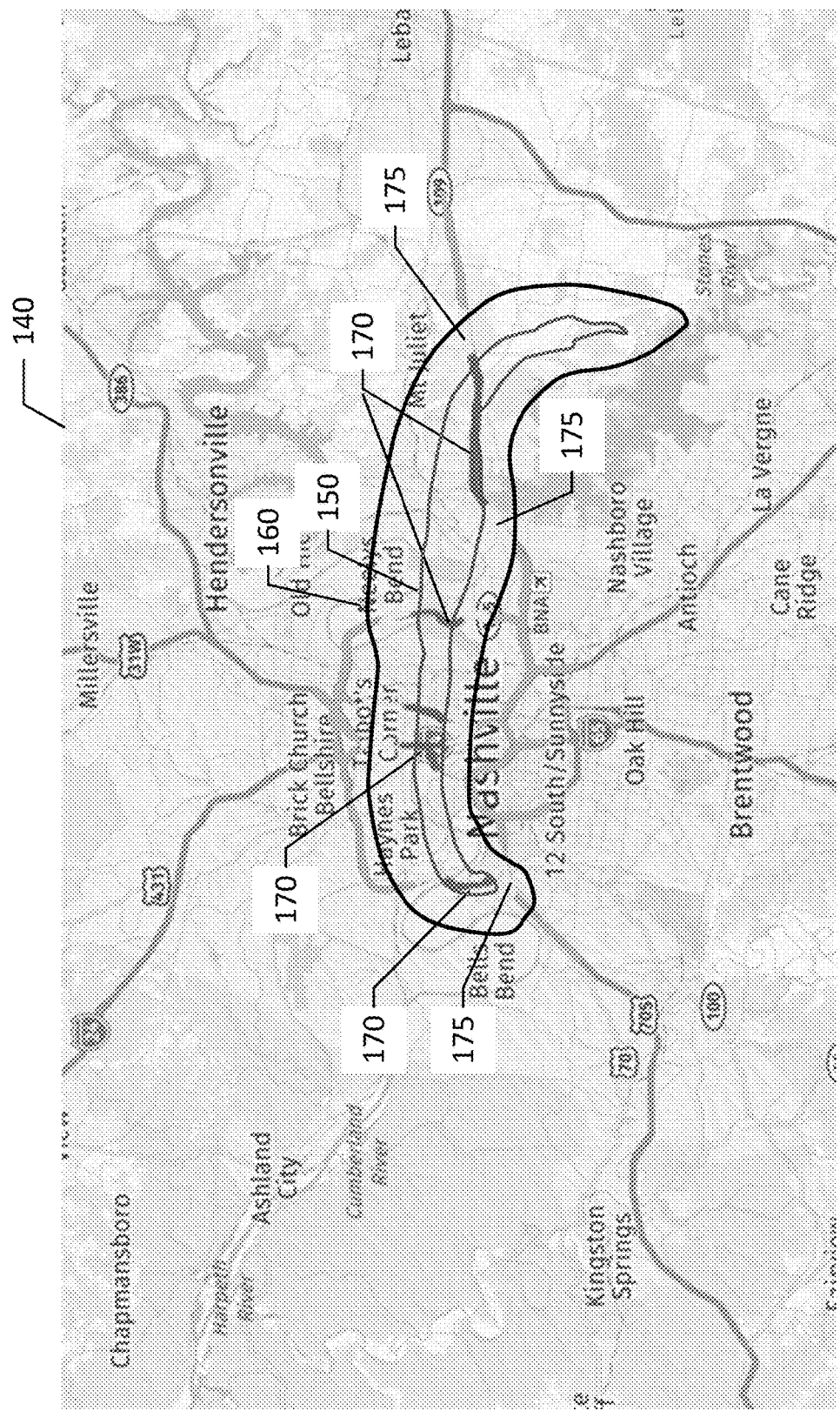

Having thus described certain example embodiments of the present disclosure in general terms, reference will hereinafter be made to the accompanying drawings which are not necessarily drawn to scale, and wherein:

FIG. 1 is a block diagram of an apparatus for estimating the reliability of objects in an environment according to an example embodiment of the present disclosure;

FIG. 2 is a block diagram of a system for estimating the reliability of objects in an environment according to an example embodiment of the present disclosure;

FIG. 3 is a map of a road network according to an example embodiment of the present disclosure;

FIG. 4 is the road network map of FIG. 3 including the path of an event according to an example embodiment of the present disclosure;

FIG. 5 is the road network map of FIG. 3 including the path of an event and a boundary associated therewith according to an example embodiment of the present disclosure;

FIG. 6 is the road network map of FIG. 3 indicating the impact to object reliability according to an example embodiment of the present disclosure;

FIG. 7 is a table of object impact scores according to object type and event severity according to an example embodiment of the present disclosure;

FIG. 8 is a table of operational scores for road links according to an example embodiment of the present disclosure; and FIG. 9 is a flowchart of operations for estimating the reliability of objects in an environment according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content,"

"information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Traditional locating techniques where an object, such as a vehicle or mobile device identifies its own location, may include GNSS-based (Global Navigation Satellite System) localization which offers accuracy of as high as within one meter; however, the reliability and repeatability is susceptible to error. Multi-path interference, ionospheric delay, obstructions, and even satellite clock error/unsynchronization may be issues, particularly in urban environments with urban canyon effects. These issues render GNSS-based localization too coarse or inaccurate and unreliable to be relied upon exclusively for autonomous vehicle control. DGPS (differential global positioning system) localization techniques may offer accuracy down to centimeters; however, the localization process has substantial latency which fails to satisfy the time efficiency needs for autonomous vehicle control reliance.

Localization and object identification for purposes of autonomous vehicle control require real-time localization and object identification with a high degree of accuracy. Real-time localization of a vehicle assists in achieving a high level of autonomous driving, while identifying objects along an autonomous vehicle path may inform how the autonomous vehicle traverses the path. Localization, as described herein, has more stringent requirements in time efficiency (real-time) and accuracy than conventional satellite-based locating techniques (e.g., GNSS) or signal fingerprinting. However, such localization also has unique limitations such as cost (e.g., sensor array cost), power supply and availability, communications bandwidth, etc. Further, rapidly changing environments may affect the accuracy and repeatability of self-localization. Environmental factors that may impact self-localization may include weather, traffic conditions, road quality, lighting, natural events (e.g. disasters), etc. The accuracy requirement for self-localization may be on the order of centimeters, such as within one to ten centimeters while the temporal efficiency to be considered as real-time may be as within tenths or hundredths of a second depending on vehicle speed and other dynamic conditions. Further, object identification for facilitating vehicle control needs to be accurate, repeatable, and efficient.

Embodiments described herein rely upon a combination of on-board sensors and high-definition (HD) maps for localization and object identification. On-board sensors, such as cameras, LiDAR (light distancing and ranging) units, and/or Radar units, are used to provide distance measurements or observations of surrounding localization objects also referred to herein as landmarks. Observations include distance measurements between objects and their corresponding ground truth objects. These objects may be used for localization and/or for use in informing how an autonomous vehicle is to traverse a path, such as with speed limit signs, road restrictions signs, and for object avoidance. HD maps otherwise known as feature maps offer the corresponding objects pre-stored in a database as ground truth. By comparing (matching/associating) the detected and pre-stored objects, a vehicle or mobile device can establish an accurate location or become localized in the map coordinate frame. Objects used for localization and autonomous control may include semantic objects such as road facilities, pole-like objects, curbs, signs, barriers, and traffic lights, for example.

Localization relying upon localization objects is challenging, even with localization objects that are static and relatively unchanging in appearance. For example, signs and pole-like objects may be relatively consistent; however, various conditions may impede their visibility, such as weather (e.g., rain, snow, fog, etc.) or other objects (e.g., trucks, buses, or other cars). However, the use of a plurality of localization objects can mitigate these effects to some degree. While these localization objects may be considered static and substantially reliable, natural events can take place which can quickly remove static localization objects from a road network that had been used for localization purposes. Embodiments provided herein generate an indicator that will help avoid areas in which localization objects have become unreliable or may prepare a vehicle for a decrease in the autonomy level. Further, embodiments provide for self-healing of maps where objects may not be recognizable to properly rebuild a map. An autonomously controlled vehicle may become confused if localization objects and objects that influence or inform autonomous control that the vehicle anticipates being able to rely on are not present, are not in the same place, are not of the same orientation, or are not of the same shape as anticipated.

Embodiments provided herein consider the effects of natural disasters and unnatural events that may adversely affect localization and autonomous control of a device such as a vehicle. Natural disasters such as tornadoes, hurricanes, avalanches, floods, landslides, wildfires, etc. can drastically change the percentage of objects available for localization and for informing autonomous control. Further, events such as destructive riots, building or landmark collapse, or other events may similarly reduce the availability of such objects in an area. According to an example embodiment, a tornado may sweep through a region and virtually every sign and pole may be leveled and barriers damaged along sections of the road network rendering localization in those locations impossible and rendering the localization map (e.g., HD map or feature map) useless. Tracking natural and unnatural events such as natural disasters can provide a region of a road network that may be impacted that can later be verified from sensor data.

According to embodiments of the present disclosure, event tracking indicators are used to establish regions in which an event is occurring or has occurred. For weather-related events, such as tornadoes, hurricanes, strong winds, tropical storms, hail, etc., weather tracking data can be used to inform maps of the present disclosure. For non-weather-related events, such as earthquakes, mudslides, avalanches, man-made destructive events, etc., other tracking data can be used. For example, for earthquake data, geological survey information and seismic data may be gathered from a service provider such as the USGS (United States Geological Survey agency). For mudslides, avalanches, or other events that may be confined to a relatively small region, local authorities and municipal entities may be a data source. Further, entities such as FEMA (Federal Emergency Management Agency) may provide data regarding an area affected by a natural disaster such as a fire, tornado, earthquake, hurricane, etc. Any relevant data source may be scraped to identify data that may be relevant to the potential loss or change of localization objects.

The data gathered regarding natural or man-made vents may be processed to produce a dynamic layer on a map such as the HD map or feature map described herein to identify affected areas within which localization reliability may be adversely affected.

A method, apparatus and computer program product are provided in accordance with an example embodiment of the present disclosure for identifying the reliability of objects within a mapped region, and more particularly, to establishing an operational score reflecting the reliability of objects for facilitating localization and autonomous vehicle control based on events that may adversely affect objects through changing of the appearance of objects. Embodiments relate to localization and object identification which may benefit autonomous and semi-autonomous vehicle control, in addition to navigational assistance and route guidance as used in conjunction with manual vehicle control.

FIG. 1 is a schematic diagram of an example apparatus configured for performing some of the operations described herein, such as using sensor data to identify objects in an environment and to correlate the identified objects with a high-definition (HD) map. Apparatus 20 is an example embodiment that may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle with the assistance of establishing the vehicle location using a sensor-based mapping system according to example embodiments described herein and for identifying objects that may facilitate autonomous vehicle control. However, embodiments of the apparatus may be embodied or partially embodied as a mobile terminal, such as a personal digital assistant (PDA), mobile telephone, smart phone, personal navigation device, tablet computer, camera or any combination of the aforementioned systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS) sensor/antenna, accelerometer, image sensor, LiDAR (Light Distancing and Ranging) sensor, radar, and/or gyroscopic sensor. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as wirelessly, e.g., by near field communication (NFC) including, but not limited to, Bluetooth™ communication, or the like.

The apparatus 20 may include, be associated with, or may otherwise be in communication with a communications interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like).

The apparatus 20 of an example embodiment may also optionally include a communications interface 22 that may be any means such as a device or circuitry embodied in either hardware or a combination of hardware and software that is configured to receive and/or transmit data from/to other electronic devices in communication with the apparatus, such as by near field communication, described above. Additionally or alternatively, the communications interface 22 may be configured to communicate wirelessly, such as over Global System for Mobile Communications (GSM) including, but not limited to Long Term Evolution (LTE). In this regard, the communications interface 22 may include, for example, an antenna (or multiple antennas) and supporting hardware and/or software for enabling communications with a wireless communication network. Additionally or alternatively, the communications interface 22 may include the circuitry for interacting with the antenna(s) to cause transmission of signals via the antenna(s) or to handle receipt of signals received via the antenna(s). In some environments, the communications interface 22 may optionally support wired communication or may alternatively support vehicle to vehicle or vehicle to infrastructure wireless links.

The apparatus 20 may support a mapping or navigation application so as to present maps or otherwise provide navigation, driver assistance, or some degree of autonomous control of a vehicle. For example, the apparatus 20 may provide for display of a map and/or instructions for following a route within a network of roads via user interface 28. In order to support a mapping application, the computing device may include or otherwise be in communication with a geographic database, which may be a map of a sensor-based localization system, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment of an apparatus for use in a sensor-based localization system, the map stored in memory 26 may include a database of geo-referenced images used to identify the location of a vehicle through sensor-based localization techniques. In an example in which the apparatus is embodied by a vehicle, the memory 26 may store a portion of a map database including only portions of the database that are within a predetermined geographic region relative to the vehicle such that latency may be minimized when establishing a location through analysis of the geo-referenced images or objects.

In example embodiments, a navigation system user interface, such as user interface 28, may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Having an accurate understanding of a location facilitates navigation assistance and autonomous or semi-autonomous vehicle control. Further, having an accurate understanding of the objects along a road link may facilitate autonomous or semi-autonomous vehicle control.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. Autonomous and semi-autonomous vehicle control may be performed in a variety of different ways. However, an understanding of the location of the vehicle facilitates use of any form of map-based vehicle control. Levels of autonomy in autonomous vehicle control are defined by a convention of levels 0 through 5. Level 0 includes no automation and requires full manual control of the steering, brakes, acceleration, etc. Level 1 autonomy or driver assistance includes features where a car controls either the steering or vehicle speed, but not both simultaneously. Level 1 may include adaptive cruise control or automatic braking, for example. Level 2 or partial automation may include autonomous control of the steering, acceleration, and braking under certain circumstances, while a driver is necessary to oversee the control and take control when necessary. Level 4 or high automation includes a vehicle with a driver, but the driver can cede control the vehicle based on the appropriate environment such as a road class or geographic area. Level 5, or full autonomy includes a driverless car that can operate on any road and in any condition without requiring human interaction.

While some degree of autonomy can be provided through visual identification of objects along a road by a vehicle traveling along the road, such vision-based autonomous control strategies may benefit from or rely upon proper location identification of the vehicle among the road network. For example, accurately identifying the location of a vehicle along a road segment may enable identification of roadway restrictions, such as a speed limit, but also provide an understanding of the road geometry which may be stored in the map database, such as in a High Definition (HD) map database. In such embodiments, sensors on the vehicle may be used to establish dynamic obstacles and other vehicles on the road segment, while an understanding of the environment may rely upon accurate identification of the vehicle on a road segment.

Autonomous and semi-autonomous vehicles may use HD maps to help navigate and to control a vehicle along its path. These HD maps may provide road geometry, lane geometry, landmarks or localization objects, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may provide cloud-based services and/or may operate via a hosting server that receives, processes, and provides data to other elements of the system. The map data service provider 108 may provide services to an OEM (Original Equipment Manufacturer) service, such as an OEM cloud, whereby the OEM cloud receives map information and updates, and provides updates and information to a vehicle of the OEM or employing the OEM hardware or software.

In one embodiment, the mobile device 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The map data service provider may include a map database 110 that may include node data, road segment data or link data, point of interest (POI) data, traffic data, geo-referenced image data for vision-based locating, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region. As noted above, sensor data from vehicles may be processed according to example embodiments described herein using a perception system to identify objects and features of a road segment. This data may be used to build and/or update the map database 110.

The map database 110 may be a master map database, such as an HD map database as described further below, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features and/or to facilitate autonomous or partial autonomous control of a vehicle. In such a case, the map database 110 can be downloaded or stored on the end user device which can access the map database 110 through a wireless or wired connection, such as via a processing server 102 and/or the network 112, for example. Such an embodiment may benefit vehicles using or relying on vision-based locating by storing or caching a portion of the database of geo-tagged images used for vision-based mapping on memory local to the vehicle in order to reduce or eliminate latency, which may be important during autonomous vehicle control that relies upon accurate location identification during operation.

As described above, the map database 110 of example embodiments may be generated from a plurality of different sources of data. Additional data may be stored in the map database such as traffic information, routing information, etc. This data may supplement the HD map data that provides an accurate depiction of a network of roads in the geographic region in a high level of detail including road geometries, localization objects along the roads such as signs, poles, curbs, rules related to travel along road segments such as speed limits, etc. The data stored in the map database may be gathered from multiple different sources, and one source of data that may help keep the data in the map database fresh is map data provided by vehicles traveling along the road segments of the road network. As described above, the data gathered regarding natural or man-made vents may be processed to produce a dynamic layer on a map such as the HD map or feature map described herein to identify affected areas within which localization reliability may be adversely affected and the availability of objects anticipated along road links of a road network may be compromised.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a GNSS may provide data relating to the path of a road segment, while vehicles with more technologically advanced sensors may be able to provide additional information regarding the presence and quality of localization objects. Sensor data from image sensors or depth sensors such as LiDAR may provide details regarding the features of road segments including the position of signs, poles, or other localization objects along the road segment and may identify the information contained on signs. This data may be crowd sourced by map data service providers 108 to build more robust and reliable maps with a greater level of detail than previously available, and this data may be used to confirm the presence of localization objects and thus the reliability of localization in an area affected by an event such as a natural disaster. Further, beyond building the maps in the map database 110, sensor data may be used to update map data or confirm existing map data to ensure the map database 110 is maintained and as up-to-date as possible.

Autonomous and semi-autonomous vehicles leverage sensor information relating to roads, objects, and features proximate the roads to determine safe regions of a road to drive and to evaluate their surroundings as they traverse a road segment. Further, autonomous and semi-autonomous vehicles may use high-definition map information to facilitate autonomous driving and to plan autonomous driving routes. These high-definition maps or HD maps may be specifically designed and configured to facilitate autonomous and semi-autonomous vehicle control and may be able to replicate road segments virtually with the inclusion of accurately placed signs and detailed information contained therein along with other features or objects proximate a roadway.

HD maps may have a high precision at resolutions that may be down to several centimeters and may identify objects proximate a road segment, features of a road segment including lane widths, lane markings, traffic direction, road signs, speed limits, lane restrictions, etc. Autonomous and semi-autonomous vehicles may use these HD maps and localization objects identified in the HD maps to facilitate the autonomous control features, such as traveling within a lane of a road segment at a prescribed speed limit, or following instructions of a road sign identified along a road segment. Autonomous vehicles may also be equipped with a plurality of sensors to facilitate autonomous vehicle control. Sensors may include image sensors/cameras, LiDAR, GPS, Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

Embodiments described herein go beyond conventional localization and autonomous vehicle control by identifying events that may impact the reliability of object that may be used for localization and/or for facilitating autonomous control as various types of events may alter or eliminate objects thereby reducing the reliability of vehicle operation that would rely upon those objects.

As described above, event data may be sourced from a variety of available sources that define locations and scale of events, such as tornadoes and their respective strengths. Embodiments may consider only events that satisfy a predetermined likelihood of damage to objects. For example, in a typical storm, if wind gusts remain below a predetermined speed (e.g., 40 miles per hour), the storm may be presumed to have done little damage to objects. However, when an event satisfies a predetermined likelihood of damage, embodiments may add a location or path of the event in a dynamic layer on the HD map to define an area in which objects may be damaged resulting in less reliable localization and autonomous operation. Embodiments may err on the side of safety until sensor data can provide sufficient data regarding objects in an area to confirm or dispute the event being damaging to such objects.

Embodiments provided herein establish a "operational score" or probability score for the likelihood of reliability of objects in an area used for localization and/or autonomous operation affected by an event. Operational scores may be on a scale such that as events become more significant (e.g., the damaging properties of the event become more intense), the operational score reflecting the reliability of objects in the region for localization and operation will be reduced. Such a scale allows driving decisions to be better made where re-routing may be possible, or if re-routing is not possible, ample warning can be provided to a driver that autonomous vehicle control may be reduced and the driver may need to assume manual control of the vehicle.

FIG. 3 is a map 140 of a road network of a city without characterization of the reliability of localization data among the road network. FIG. 4 illustrates the path 150 of a tornado across the region impacting the city and the road network shown on the map 140. The path 150 illustrated in FIG. 4 may reflect the swath of damage from the tornado. The data used to generate the path 150 may come from weather data such as from the US National Weather Service (NWS). The data may be generated in a number of ways, such as through the use of doppler radar to live-track the tornado and the potential path of destruction. The data may also be updated, such as through on-the-ground crews used by the National Weather Service to confirm the presence of a tornado and the respective strength. Thus, while an event may be mapped to an area in real-time or near-real time (i.e., within seconds or minutes), the mapped region of the event may change as more data is gathered. Further, the probability that the objects in an area can be relied upon for localization and operation may change as more data is collected. For example, tornados may be presumed to have gone through an area based on initial weather reports and ground spotters; however, the strength and path of the tornado on the ground may be subject to confirmation and established later.

Event data may also be gathered based on crowd-sourcing, such as weather events identified through individual weather stations from which users share data. These weather stations may be small devices mounted at a property by an owner to contribute to the gathering of weather information which enhances weather forecasting. These weather stations may also be used to form a better understanding of where a weather event has taken place.

Depending upon the type of event, an area around the actual event may be subject to damage to objects used for localization and operation. Therefore, a boundary region around the event may be established based on a size and severity of the event. For example, while a tornado may cut a swath of damage across a region, a boundary around that region may be established where damage, possibly to a lesser degree, may have occurred. In this boundary the probability that the objects being relied upon for localization and operation remain intact may be higher than the location or path of the actual event, but that probability may not be as high as an area distant from the area of the event. FIG. 5 illustrates such a boundary 160 around the event path 150. Optionally, a boundary may be formed for warning of a user entering the boundary that they are approaching a region in which the probability of localization objects being relied upon is low or relatively low, allowing the user and/or a vehicle of the user to take evasive action through avoidance of the area, decreasing speed (and potentially increasing frame or capture rates of sensors), or deactivating one or more autonomous control features and ceding control of the vehicle to the user. While FIG. 5 illustrates a boundary defined around the event path, embodiments may not require a boundary, but instead use a location (e.g., defined by a latitude and longitude) and a predefined radius around that location, which may be predefined based on an event type and severity, for example. Further, instead of a boundary, an event area may be defined by a plurality of locations and an area defined by that plurality of locations. Consequently, any point location, area, or boundary may be used to define the affected region of an event.

FIG. 6 illustrates the effect of the event, in this case a tornado, on the probability of localization objects being reliable in a path of the event. While the illustrated embodiment only depicts coding for major roads such as interstates, all roads within the path or proximate the path of the event may be coded similarly. In the illustrated embodiment, road segments 170 within the path 150 are coded with a probability reflecting the effects of the event, as described further below. The road segments 175 within the boundary 160 may be coded with a second probability, higher than the probability reflecting the effects of the event within the event path 150, but less than a probability outside of the boundary 160. Optionally, rather than a reduction of the probability outside of the path 150 of the event but within the boundary 160, embodiments may provide an indication of the road segment being in proximity to the path 150 of the event, where increased caution may be taken either by the autonomous vehicle controls or by the driver.

Events such as hurricanes can span many miles, and may vary in intensity as they progress along their path. Events and the paths or locations associated therewith may include areas of differing intensity or portions of a path of differing intensity. These events having differing severity may be considered separate events for each different severity, or the events may have 'sub-events' wherein the event may be a patchwork of areas of different severities of the event. According to such embodiments, the location or path of the event may be sub-divided into these areas whereby the objects within the sub-divided areas are considered according to the severity of the event at their respective locations.

While FIGS. 4-6 illustrate a boundary of an area in which an event has occurred, events may be identified only by a location or an area. For example, an event may be identified as having occurred or anticipated to occur at one or more locations. These locations may be identified by latitude and longitude, for example. The operational score may then be identified at those locations rather than within a larger boundary. Such locations may provide a more concise map layer and may in some instances provide a more accurate representation of how an event impacted a region.

Embodiments described herein may apply an impact score to a category of localization objects based upon the event type and event severity. Different objects may respond differently to different types of events, and some object types may be damaged from an event while other object types are not damaged. FIG. 7 illustrates a table of a number of event types and strengths 210 with their corresponding conditions 220. The object types 230 are also shown, together with an impact score score 240 that is established based on how robust a type of object is to the event type and strength 210. As shown, signs are vulnerable to tornadoes and even strong winds. As shown in the first row, strong winds of 50-65 miles per hour in an area result in an impact score of 0.85 or 85% for signs, which means that there is an 85% likelihood that any given sign in an area of the event is undamaged or would remain suitable for localization or autonomous operation. In a tornado class EF-5, the impact score for signs is 0.01 or 1%, translating to a likelihood of 99% that a given sign would have been rendered useless for localization or autonomous operation during or after such an event.

While signs are shown as susceptible to strong winds, poles are a class of object that are more robust, while jersey barriers (concrete dividing barriers) are very robust and are likely to remain suitable for localization and autonomous operation through most conditions. While the table of FIG. 7 only illustrates three types of objects, other types of object may be available and classified accordingly. Similarly, while only wind and tornado events are depicted in FIG. 7, other events may include wildfires, hurricanes (also with varying degrees of strength), floods, hail storms, avalanches, mud slides, tsunamis, man-made events such as vandalism, etc. Thus, embodiments may include a database that provides an impact score for categories of objects based upon the type of event and severity of the event. While signs, poles, and jersey barriers are illustrated as categories of objects, embodiments may include more granular categories. For example, signs that are on more robust poles, such as on street lamps or traffic light poles may be more resilient than signs that are on aluminum or steel channel mounts. Similarly, poles that are wood may be more susceptible to damage than galvanized steel poles. Jersey barriers of concrete may be more resilient than similar plastic barriers. Each of these sub-categories of objects may be used to better identify the impact score and the likelihood of an object being damaged in any given event.

Example embodiments may establish an impact score based on the likelihood of physical damage to an object based on the event type and event severity. This physical damage may be in the form of deformation of an object, change of position of the object, or absence of the object, for example. However, certain events may cause objects to be unrecognizable but not necessarily damage the object. For example, a big storm in a heavily treed area may not rise to the level of damaging signs or other objects from the winds; however, branches may fall from trees, or trees may fall that may obscure an object. Similarly mud and dirt may be picked up in a storm and cause an object to be obscured. During a snowstorm, snow may adhere to an object under certain conditions. As such, an impact score may be established based on a likelihood of non-destructive obscuring of objects. This impact score may be separate from or combined with the impact score based on likelihood of damage to an object described above with respect to FIG. 7.

Objects within the map may be given the impact score probability values based on the event in a dynamic map layer. Referring back to FIG. 4, the objects within the path 150 of the tornado may be given the impact score value from the table in the database, which may be stored, for example, in map database 110 or in memory 26. The impact score of the objects along a road link may be used to generate an operational score for the road link itself. Individual objects are not of themselves critical for localization and autonomous operation; however, the combination of objects along a road link are critical for localization and autonomous operation. As such, the impact score of the objects along a road link may be used to generate the operational score for the road link. Such an operational score for a road link may be representative of an average of the impact scores of the objects along the road link, or the operational score of the road link may be a weighted average of the impact scores of the objects along the road link. For example, certain objects that contribute more to localization and autonomous operation may have a higher weight, such as objects that are more easily discerned from an environment and of a unique shape and/or size. Such objects may be reliable for localization and/or autonomous operation when in normal condition, such that these objects may weigh heavier in determining the operational score for a road link.

The HD map may then rely on feedback from sensor data from vehicles traveling in the area to identify differences in the mapped objects versus the real-world status of the objects. In this way, embodiments respond to the event proactively with a degradation in the reliability of objects for localization and autonomous operation based on the operational score corresponding to the event. Thereafter, observed data is used to adjust the impact score for the objects in the area of the event, and consequently the operational score for road links along which the objects are found.

Initial feedback to the map services provider can be fine-tuned by adding an 'observed score' value to the same map layer having the impact scores corresponding to the event. Through sensor data gathered in the location of the event and through machine learning, objects will be slowly healed or removed from the HD map. As this healing and removal or "pruning" of lost objects, the operational score for the area will increase as will the observed score until ultimately the map is fully restored and high operational scores and observed scores achieved. FIG. 8 illustrates a table showing the location in latitude and longitude 250, the road link ID 260 of the road link at the location, the operational score 270, and the observed score 280.

To calculate the observed score, the calculation may be based on changed versus observed objects on a road network. For example, if there are fifteen sign objects along a given road link and twelve are detected, then the observed score would be 0.8 as 80% of the signs were found. Over time, with consistent observations, it may be established that the three signs not found were destroyed or moved (e.g., blown away). Once enough observations are confirmed that the three signs can be removed from the healed map, the denominator of the calculation will be changed. This means that over time the map will then reflect twelve signs in the map along the given road link, where twelve signs are detectable raising the operational score to 1.0 or 100%.

Embodiments provided herein may identify specific areas in need of observations from sensors to obtain observed data. Additional observations from sensor data can be sourced from vehicles (e.g., fleet management), drones (e.g., deployed to specific areas where there is urgency to update the status of localization elements), satellite imagery, probe data, etc.

The observed operational score and the operational score established based on the event, event severity, and the object type may be used to learn to better predict the operational score. The table identifying impact scores for object categories and event type/severities, such as the sample table in FIG. 7, may be adjusted through learning and feedback from observed impact scores of objects after an event. For example, while signs have a localization score of 0.85 in response to winds of up to 65 miles per hour, observed localization scores may find that a value of 0.95-1.00 may be routine, such that the value of 0.85 may be adjusted upward. As noted above, embodiments may err on the side of caution such that the impact score of the object in the table may intentionally be lower than conventionally observed; however, the learning process of using observed localization scores may improve the accuracy of the impact score estimated for various events and severities, more closely aligning impact scores with observed scores.

While road links are described above as having an operational score derived from the probability of objects along the respective road link being reliable for localization and autonomous operation, embodiments provided herein may optionally use the score of different classes of objects to re-focus sensor data to focus on objects that are more likely to be reliable sources for localization and autonomous control. For example, while an event may correspond to a very low impact score for signs indicating that the signs are likely to have been rendered ineffective for localization and operation, but the event corresponds to a relatively high localization score for poles indicating that poles are likely to remain effective for localization and operation. In such an example embodiment, a vehicle traveling along a road segment may adapt the sensor usage strategy to focus on pole objects for localization and/or autonomous operation while minimizing reliance on signs for localization and/or autonomous operation.

Observed sensor data may optionally be used to improve the accuracy with which an event location is established. For example, referring back to the tornado path 150 of FIG. 4, the objects within the boundary may be afforded the impact score based on the event and severity of the event. However, as sensor data is collected from observations around the tornado path 150, if a region proximate the path is found to have a very low impact scores for objects observed consistently over several observations, the path 150 of the tornado may be expanded to include the region proximate the original path.

FIG. 9 illustrates a flowchart depicting a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 9 is a flowchart of a method for identifying the reliability of objects within a mapped region, and more particularly, to establishing an operational score reflecting the reliability of objects for facilitating localization and autonomous vehicle control based on events that may adversely affect objects through changing of the appearance of objects. An indication of an event is received at 310 where the indication includes event data. The indication may be received, for example, from a weather service provider, a municipality, or other service provider, and the event data may include a type of event and a severity of an event along with location information. An area within which the event is estimated to occur or have occurred is identified at 320. This area may be established based on the location information from the event data, for example. The area may be a point location, a point location with a radius, a plurality of point locations, a path, etc. At least one object within the area is assigned an impact score based on the event data at 330, where the impact score represents a likelihood that the object is unaffected by the event. According to some embodiments, an indication of a reduction in autonomous vehicle capability may be provided based on the impact score of at least one object failing to satisfy a predetermined value.

At least one operational score for at least one road link is identified at 340 based on the impact score of the at least one object along the at least one road link. The operational score may identify the overall likelihood that objects used for localization and/or autonomous vehicle control remain intact and unaffected by the event. The operational score may be established based on the impact score of objects along the at least one road link. An indication of the operational score of the at least one road link is provided for delivery to at least one of an autonomous vehicle or an occupant thereof at 350. The indication of the operational score may be received from a map services provider, where the map services provider may update a map to reflect an operational score of a road link based on the impact of the event on objects along the road link. The indication to an occupant of an autonomous vehicle may provide an alert that autonomous capability is reduced along the at least one road link or that autonomous control will be ineffective on the at least one road link, such that control of the vehicle is ceded to the driver. An indication to an autonomous vehicle approaching or traveling along the at least one road link may cause the autonomous vehicle to take action based on the operational score, such as slowing the vehicle, increasing the frame rate of sensors on the vehicle to help identify any remaining objects along the road links, or otherwise affecting the autonomous control of the vehicle up to and including ceasing autonomous operation. Optionally, the indication of the operational score for the at least one road link may cause an autonomous vehicle or operator thereof to avoid the at least one road link if the operational score fails to satisfy a predetermined value.

In an example embodiment, an apparatus for performing the method of FIG. 6 above may comprise a processor (e.g., the processor 24) configured to perform some or each of the operations (310-350) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of an event having event data;
   identify an area within which the event is estimated to occur or to have occurred, wherein the event comprises an event capable of reducing availability of objects within the area;
   assign at least one object within the area an impact score based on the event data, wherein the impact score reflects a likelihood of the at least one object remaining suitable for localization;
   identify at least one operational score for at least one road link based on the impact score of the at least one object along the at least one road link; and
   provide an indication of the operational score of the at least one road link to be delivered to at least one of an autonomous vehicle or an occupant thereof.

2. The apparatus of claim 1, wherein causing the apparatus to provide an indication of the operational score of the at least one road link to at least one of an autonomous vehicle or occupant thereof comprises causing the apparatus to:
   provide an indication of the operational score of the at least one road link to at least one of an autonomous vehicle or occupant thereof in response to a route of the autonomous vehicle traversing the at least one road link.

3. The apparatus of claim 2, wherein causing the apparatus to provide an indication of the operational score of the at least one road link to at least one of an autonomous vehicle or occupant thereof further comprises causing the apparatus to:
   provide an indication of autonomous vehicle control being reduced in response to an operational score below a predefined threshold.

4. The apparatus of claim 2, wherein causing the apparatus to provide an indication of the operational score of the at least one road link to at least one of an autonomous vehicle or occupant thereof further comprises causing the apparatus to:
   provide an indication of autonomous vehicle control ceasing before traversing the at least one road link.

5. The apparatus of claim 1, wherein causing the apparatus to assign at least one object within the area an impact score based on the event data comprises causing the apparatus to:
   identify a plurality of object types; and
   assign the plurality of object types an impact score based on the object type and the event data, wherein the event data comprises event type and event severity.

6. The apparatus of claim 5, wherein causing the apparatus to assign the plurality of object types an impact score based on the object type and the event data comprises causing the apparatus to:
   assign the plurality of object types an impact score based on the object type and the event data from a relational database relating object type resiliency to event types and event severities.

7. The apparatus of claim 1, wherein the apparatus is further caused to:
   receive, from sensor data collected along the at least one road link, an observed impact score; and
   update an operational score for the at least one road link based on the observed impact score.

8. The apparatus of claim 1, wherein the indication of the event is received from a weather information source, wherein the area within which the event is estimated to have occurred is received from the weather information source based on gathered weather data.

9. A computer program product comprising at least one non-transitory computer-readable storage medium having computer-executable program code instructions stored therein, the computer-executable program code instructions comprising program code instructions to:
receive an indication of an event having event data;
determine at least one operational score for at least one road link based on estimated impact of the event on one or more objects associated with the at least one road link, wherein the event comprises an event capable of reducing availability of objects within the area and the estimated impact of the event on the one or more objects associated with the at least one road link comprises a likelihood of the at least one object remaining suitable for localization; and
provide an indication of the operational score of the at least one road link to at least one of a map services provider, an autonomous vehicle, or an occupant thereof.

10. The computer program product of claim 9, wherein the program code instructions to provide an indication of the operational score of the at least one road link to at least one of a map services provider, an autonomous vehicle, or an occupant thereof comprise program code instructions to:
provide an indication of the operational score of the at least one road link to at least one of an autonomous vehicle or an occupant thereof in response to a route of the autonomous vehicle traversing the at least one road link.

11. The computer program product of claim 10, wherein the program code instructions to provide an indication of the operational score of the at least one road link to at least one of a map services provider, an autonomous vehicle, or an occupant thereof further comprise program code instructions to:
provide an indication to at least one of an autonomous vehicle or occupant thereof of autonomous vehicle control being reduced in response to an operational score below a predefined threshold.

12. The computer program product of claim 10, wherein the program code instructions to provide an indication of the operational score of the at least one road link to at least one of a map services provider, an autonomous vehicle, or an occupant thereof further comprise program code instructions to:
provide an indication to at least one of an autonomous vehicle or occupant thereof of autonomous vehicle control ceasing before traversing the at least one road link.

13. The computer program product of claim 9, wherein the program code instructions to determine at least one operational score for at least one road link based on estimated impact of the event on one or more objects comprise program code instructions to:
identify a plurality of object types associated with the at least one road link; and
assign the plurality of object types an impact score based on the object type and the event data, wherein the event data comprises event type and event severity.

14. The computer program product of claim 9, further comprising program code instructions to:
receive, from sensor data collected along the at least one road link, an observed impact score for the one or more objects; and
update an operational score for the at least one road link based on the observed impact score.

15. The computer program product of claim 9, wherein the indication of the event is received from a weather information source, wherein the at least one road link is within an area within which the event is estimated to have occurred, wherein the area is received from the weather information source based on gathered weather data.

16. The computer program product of claim 9, wherein the impact score comprises a probability that the corresponding object is reliable for informing autonomous vehicle control.

17. A method comprising
receiving an indication of an event having event data;
assigning at least one object at a location of the event an impact score based on estimated impact of the event, wherein the event comprises an event capable of reducing availability of objects within an area and the estimated impact of the event comprises a likelihood of the at least one object remaining suitable for localization or control of an autonomous vehicle; and
providing an indication of a reduction in autonomous vehicle capability in response to the impact score of at least one object failing to satisfy a predetermined value.

18. The method of claim 17, wherein providing an indication of a reduction in autonomous vehicle capability in response to the impact score of at least one object failing to satisfy a predetermined value comprises providing a temporary indication of a reduction in autonomous vehicle capability associated with at least one road link associated with the at least one object in response to the impact score for the at least one object failing to satisfy the predetermined value.

19. The method of claim 18, further comprising:
providing the indication of a reduction in autonomous vehicle capability associated with the at least one road link to at least one device associated with a vehicle in response to the at least one device associated with the vehicle having a travel path including the at least one road link.

20. The method of claim 17, wherein the indication of the event is received from a weather information source, wherein the at least one road link is within an area within which the event is estimated to have occurred, wherein the area is received from the weather information source based on gathered weather data.

* * * * *